(12) United States Patent
Harms et al.

(10) Patent No.: US 7,678,273 B2
(45) Date of Patent: Mar. 16, 2010

(54) MEMBRANE PLATE AND FILTER ELEMENT

(75) Inventors: Eberhard Harms, Muppert (DE); Mark Grigo, Soest (DE)

(73) Assignee: Utisol Technologies AG, Zug (CH)

( * ) Notice: Subject to any disclaimer, the term of this patent is extended or adjusted under 35 U.S.C. 154(b) by 618 days.

(21) Appl. No.: 10/555,968

(22) PCT Filed: May 7, 2004

(86) PCT No.: PCT/CH2004/000276

§ 371 (c)(1),
(2), (4) Date: Aug. 15, 2006

(87) PCT Pub. No.: WO2004/098754

PCT Pub. Date: Nov. 18, 2004

(65) Prior Publication Data

US 2007/0023348 A1 Feb. 1, 2007

(30) Foreign Application Priority Data

May 9, 2003 (EP) .................. 03405326

(51) Int. Cl.
*B01D 29/01* (2006.01)
*B01D 25/02* (2006.01)
*B01D 61/00* (2006.01)

(52) U.S. Cl. .................. 210/346; 210/321.84; 210/459; 210/321.75

(58) Field of Classification Search ........................ None
See application file for complete search history.

(56) References Cited

U.S. PATENT DOCUMENTS 6,843,908 B2 * 1/2005 Okajima et al. ............. 210/151

FOREIGN PATENT DOCUMENTS

| DE | 10151833 A1 | 5/2003 |
|----|-------------|--------|
| EP | 0662341 A1 | 7/1995 |
| JP | 11309345 | 11/1999 |
| JP | 2002336658 | 11/2002 |

OTHER PUBLICATIONS

WO 02/45827 A1, Multistage Immersion Type Membrane Separator and High-Concentration Wastewater Treatment Facility Using Same, Publication Date: Jun. 13, 2002.

* cited by examiner

*Primary Examiner*—Krishnan S Menon
(74) *Attorney, Agent, or Firm*—Rankin, Hill & Clark LLP

(57) ABSTRACT

A filter unit includes membrane plates placed together parallel to one another, which at least in zones around connecting elements for the purpose of draining permeate are connected together liquid-tight. The membrane plates because of their shape and after two membrane plates have been placed one on top of the other are provided for manufacturing a liquid-tight connection or a seal by welding. As a result unfiltered liquid flows through between the membrane plates and contamination of the permeate within a volume situated between the connecting elements is prevented. Over a number of connecting elements and zones located in between it is possible to attach a hollow profile, which is closed-off at its ends. This hollow profile in a liquid-tight manner surrounds discharge openings of the connecting elements and the zones located in between with positive material engagement. As a result, a permeate collection channel is formed, out of which and through a permeate discharge the permeate can be extracted through suction.

11 Claims, 5 Drawing Sheets

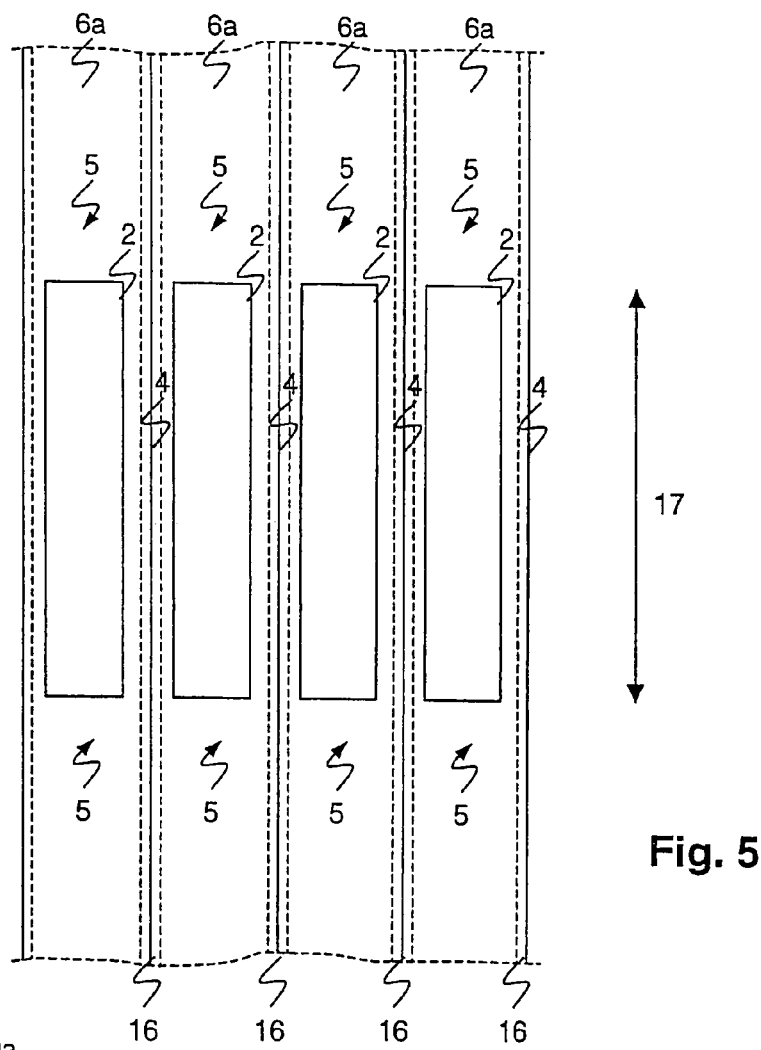
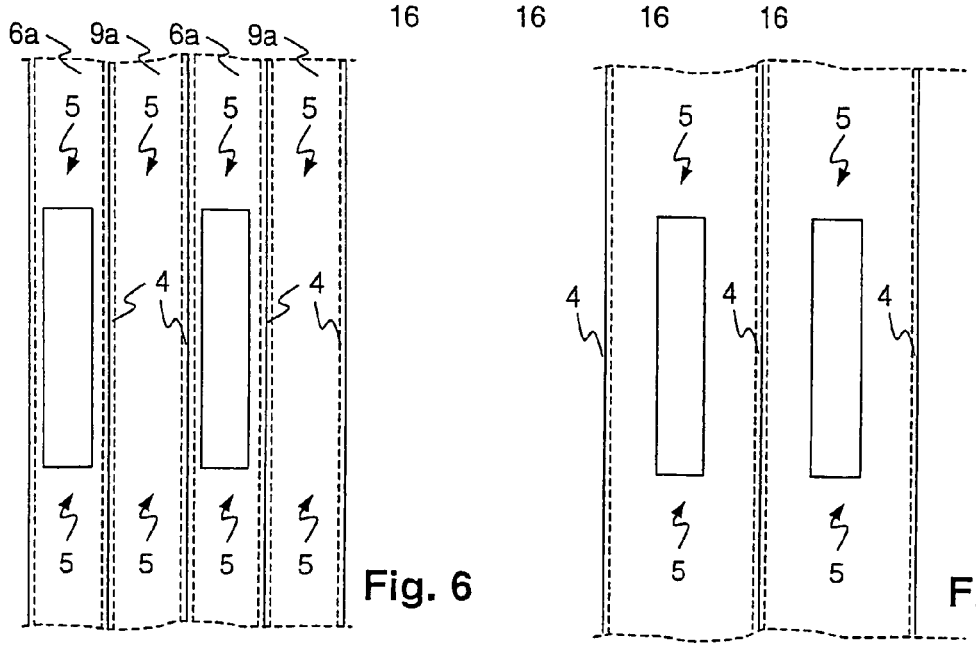
Fig. 5
Fig. 6
Fig. 7

MEMBRANE PLATE AND FILTER ELEMENT

The invention is related to the field of filtering technology, in particular to a membrane plate and a filter unit, and to a method for the manufacturing of a filter unit.

STATE OF THE ART

In filter installations, in particular in treatment plants for sewage or drinking water, filter units are utilized, which typically are equipped with membrane filters. Thereby, a plurality of membrane filters is arranged in a rectangular suspension system and is operated submerged in the liquid to be filtered. Every membrane filter comprises a supporting plate with two filter membranes. In hollow spaces or conduits within the membrane filters, permeate, i.e. filtered liquid, collects. The individual membrane filters are respectively connected through individual connections, for example, pipes or hoses, with a permeate line, which sucks the permeate out of the membrane filters. When constructing the installation, the membrane filters are installed and connected to the permeate line individually. In case of an overhaul or cleaning, they are individually disconnected. This procedure is complicated and time-consuming and it increases the manufacturing and the installation cost of the installation.

EP-A-1 016 449 demonstrates how a plurality of filter bags arranged in parallel are inserted into a basin with liquid cast resin. After the hardening of the cast resin, openings to the filter bags are machined into the cast resin. In accordance with a certain embodiment, the filter bags comprise plug-type projecting parts and recesses along two edges. With this, it is possible to combine them into a package by plugging them together. Also, in this case, the manufacturing process is complicated.

DESCRIPTION OF THE INVENTION

It is therefore the object of the invention to create a membrane plate and a filter unit of the kind mentioned above, which eliminate disadvantages of the prior art, and which in particular allow for a simple and inexpensive design of a filter unit.

In the filter unit, in accordance with the invention, at least two membrane plates are placed together parallel to one another and the at least two membrane plates are connected together in a manner sealed liquid-tight at least in zones around connecting elements for the discharge of permeate. Through their shape, the membrane plates are, after the placing one above the other of two membrane plates, prepared for the creation for such a liquid-tight connection or sealing by means of welding. Therefore no further connecting or sealing elements are necessary between or adjacent to the membrane plates.

As a result, unfiltered liquid is prevented from flowing in between the membrane plates and thus, the permeate is not contaminated in a volume located around the connecting elements. Preferably, solely a seal between the membrane plates in the zone of the connecting elements is present. A connecting element may also consist of several openings of an edge. A connecting element, respectively, the several openings, however, make use of only a comparatively small part of a longitudinal edge, for example less than one fifth or than one tenth of the longitudinal edge. As a result of this, the effort required for the creation of the seal is reduced and the reliability of the seal is enhanced.

This sealing is achieved, for example, by means of a positive engagement and thereby liquid-tight connection between the at least two membrane plates, for example, through a waterproof plug-in or snap-lock connection of a sealing profile. In another preferred embodiment of the invention, an initially positive engagement connection is present, out of which a positive material engagement connection is created. Depending on the material of the membrane plates, this takes place by gluing, welding or soldering, whereafter the membrane plates as a rule are connected together in a manner not releasable again without causing damage. Preferably, the material is a thermoplastic synthetic material, and the membrane plates are welded together, respectively, melted together in the zone between the connecting elements.

Over several connecting elements and zones located between them, it is possible to attach a hollow profile, which is closed-off at its ends. This surrounds discharge openings of the connecting elements and the zones situated in between in a liquid-tight manner, preferably with positive material engagement. As a result, a permeate collection channel is formed, out of which through a permeate discharge it is possible to suction extract the permeate.

Preferably, the mentioned connection area between membrane plates among themselves and between membrane plates and permeate collection channel are formed by flat surfaces, which allows for easy manufacturing. Connection places between individual membrane plates may also be formed by groove-spring connections, which, for example, snap-in non-positively, wedge together or are capable of being welded together. In order to increase a distance between membrane plates, dependent on the medium to be filtered and the type of contamination, it is possible to insert distance pieces or spacers at individual points, for example, between longitudinal edges of the membrane plates. These are connected in a same manner as the membrane plates, for example, plugged-in and/or welded.

In summary, from a number of identical membrane plates in accordance with the invention it is possible to manufacture a complete ready-for-operation filter module, solely by welding the welding zones for the purpose of sealing, welding-on the permeate channel and some welding beads for the connection of the membrane plates. By means of the distance pieces, in a simple manner adaptations to differing characteristics of the liquid are possible.

As a result of the very simple and inexpensive manufacture of a filter unit the necessity for elaborate overhauls is eliminated, it is possible to simply replace a filter unit as a whole. Due to its inexpensive and compact construction the filter unit in accordance with the invention is in particular suitable for domestic sewage treatment plants and water filtration.

With the term "water" or "sewage", in the application presented here respectively sewage or drinking water to be treated are designated. The invention, however, is also suitable for utilization in conjunction with other liquids.

BRIEF DESCRIPTION OF THE DRAWINGS

In the following, the invention is explained in more detail on the basis of preferred embodiments, which are illustrated in the attached drawings. These depict:

FIGS. 5 to 7 schematically different views of membrane plates placed together in the zone of permeate discharge shafts.

Figure 1:
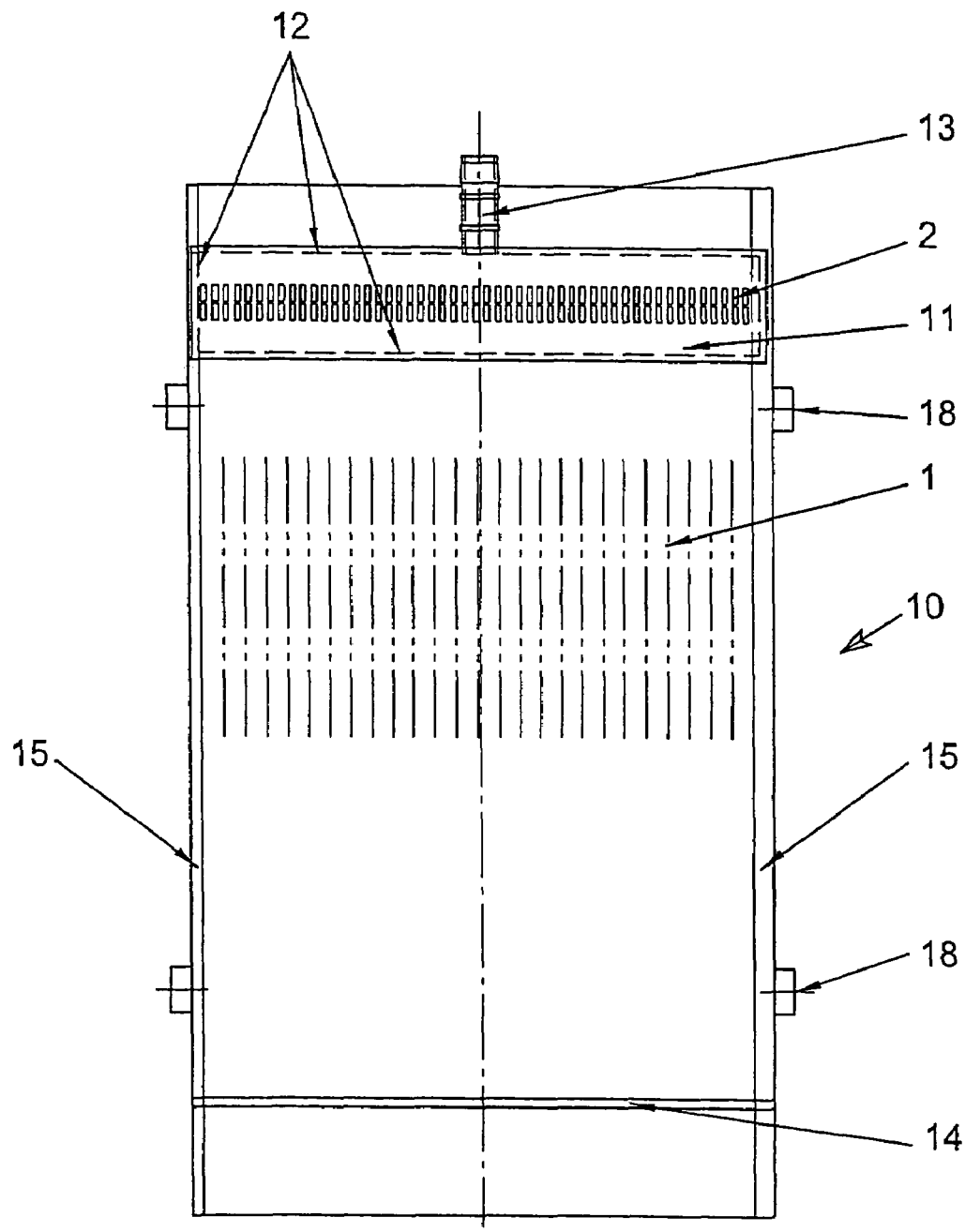
FIG. 1 is a side view of a filter unit in accordance with the invention.

The reference marks utilized in the drawings and their significance are listed in summary in the list of reference marks. On principle in the Figures the same components are identified with the same reference marks.

METHODS FOR THE IMPLEMENTATION OF THE INVENTION

Figure 2:
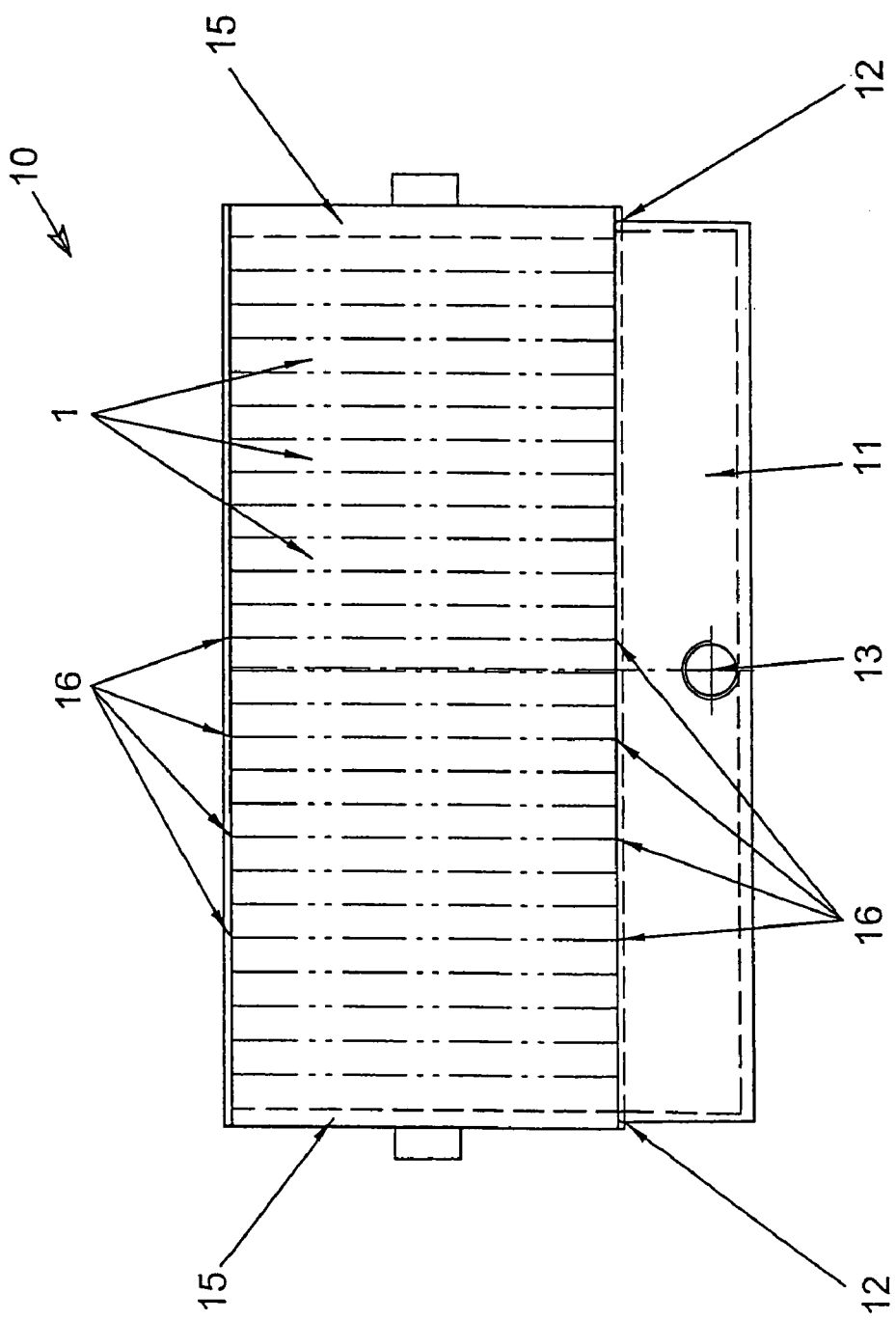
FIG. 2 is a top view of the filter unit.
Figure 3:
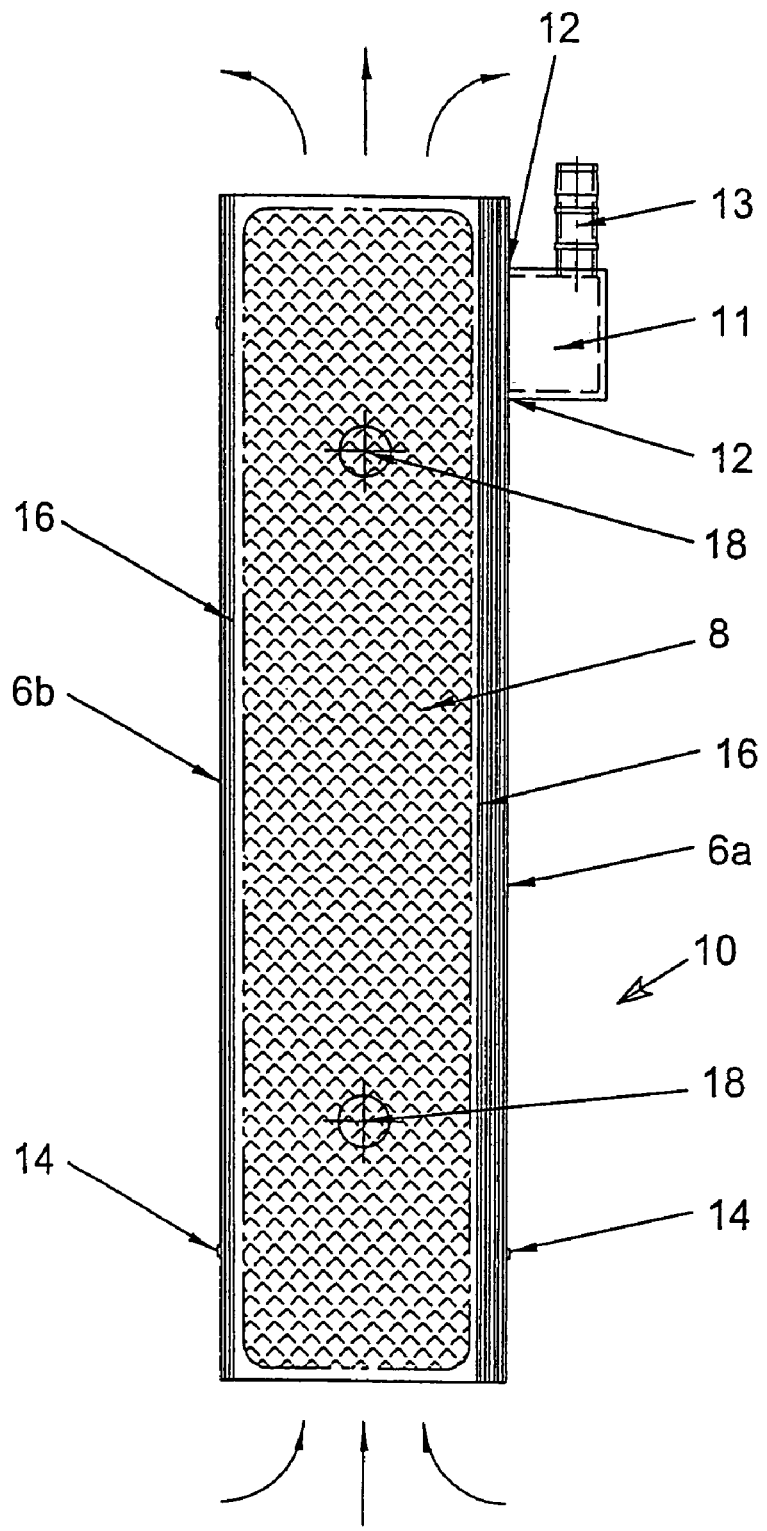
FIG. 3 is a cross sectional view of the filter unit.

FIG. 1 illustrates a side view, FIG. 2 a top view and FIG. 3 a cross-section through a filter unit 10 in accordance with the invention. The position drawn corresponds to an operating position of the filter unit 10, in which it is operated submerged in a liquid to be filtered and the liquid flows therethrough from underneath towards the top. A corresponding direction of flow is indicated with arrows. The filter unit 10 is principally formed by a plurality of membrane plates 1 placed together in parallel and covering one another, respectively, placed together congruently. A stack of membrane plates 1 of this kind may be closed-off on two sides by cover plates 15. The cover plates 15 comprise spacer burls 18 for placing further filter units 10 at a distance from one another. Within a zone of a first longitudinal edge 6a and a second longitudinal edge 6b, membrane plates 1 placed together and arranged parallel to one another are respectively connected with one another by positive engagement, for example, by groove-spring connections 16, fitting together and arranged on the longitudinal edges 6a, 6b. As a result, it is possible to form a connection through positive engagement between the at least two membrane plates 1 in the zone between the connecting elements 2. These connections do not imperatively have to be liquid-tight. It is sufficient, that the liquid flowing in an upward direction and possibly mixed with scavenging air in essence does not escape laterally through the longitudinal edges. In the described orientation of the through flow, the membrane plates 1 are not connected together along the shorter edges.

The membrane plates 1 preferably are formed as a single piece out of a thermoplastic material, for example, out of polypropylene, ABS, etc. . . . . At one or more points the membrane plates, furthermore, are welded together by welding beads 14 running vertically to the first longitudinal edges 6a or the second longitudinal edges 6b, respectively.

Here and in the following, positive engagement material connections are described, which are formed by the welding of thermoplastic material. It is, however, also possible to produce the connections by gluing, or in individual cases by liquid-tight plug-in connections. In case of the utilization of other materials for the membrane plates 1, the connections may also be soldered.

In a zone of the first longitudinal edge 6a each membrane plate 1 comprises a permeate discharge shaft 2. This leads from an internal side of the membrane plate 1 to a discharge opening located in a surface of the first longitudinal edge 6a. The discharge openings of all membrane plates 1 are surrounded by a permeate collection channel 11 with a line to the permeate discharge 13. The permeate collection channel 11 and the membrane plates 1 are welded together along a welding edge of the permeate collection channel 12. In order to seal the permeate collection channel 11 against the liquid flowing in the filter unit 10, zones of the membrane plates 1 between the permeate discharge shafts 2, respectively, their discharge openings are also welded together.

The permeate collection channel 11 may comprise a second connection nozzle (not indicated), which is located opposite to the permeate discharge 13 and which is capable of being connected with the inside of the permeate collection channel 11 through a point able to be broken through. As a result of this, it is possible to place two filter units 10 onto one another and to operate them connected together with a hose.

For large filtering capacities, the membrane plates 1 preferably comprise a second permeate shaft, and the filter unit 10 comprises a second permeate collection channel 11 (not indicated). This preferably is arranged on the opposite end to the permeate collection channel 11 on the same wall of the filter unit 10, for example, approximately at the height of the welding bead 14 indicated in FIG. 1. The permeate collection channel 11 then preferably comprises a second connection located opposite to the permeate discharge 13, which second connection is able to be connected with a permeate discharge of the second permeate collection channel by means of a hose or a piece of pipe.

Figure 4:
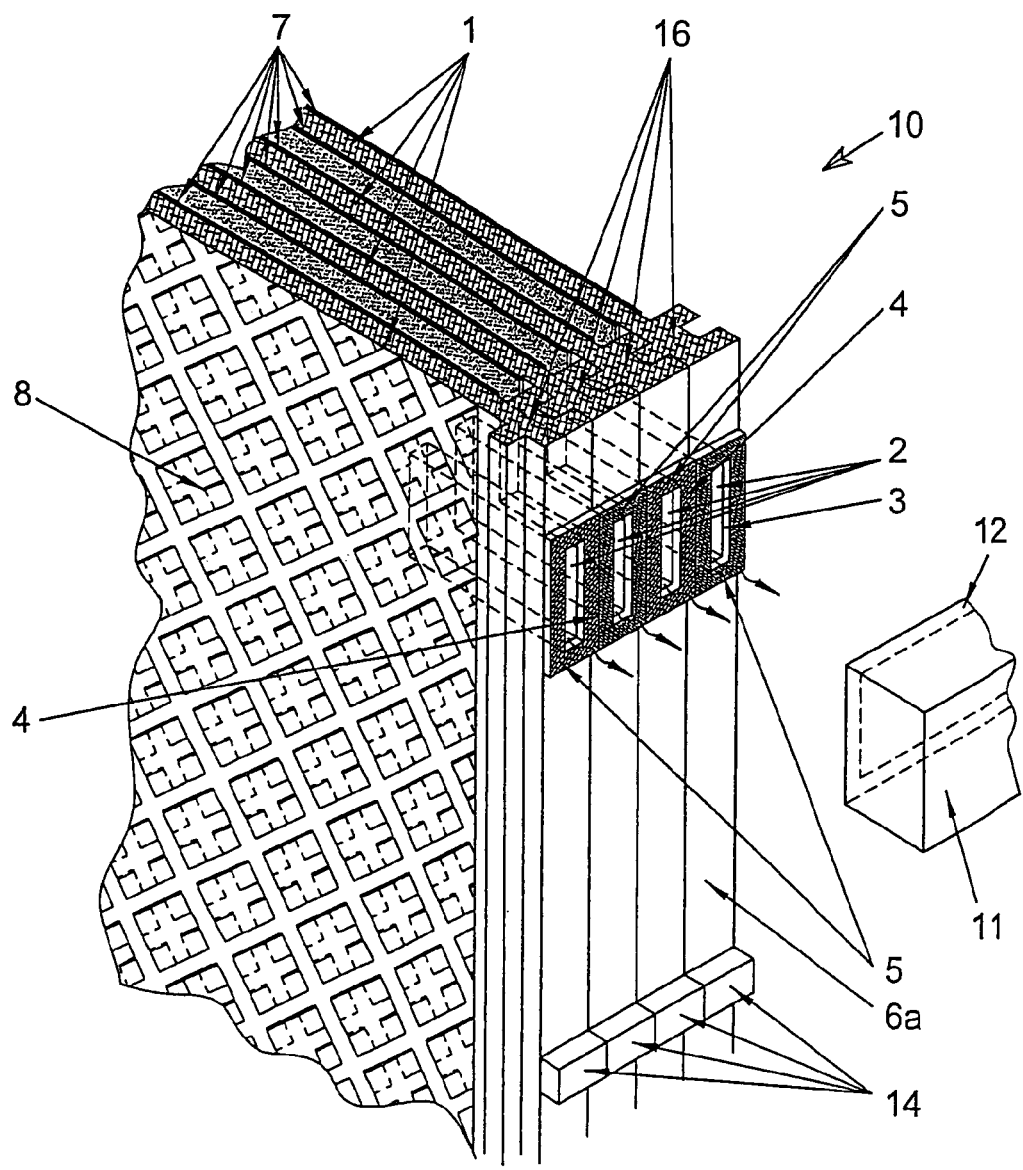
FIG. 4 schematically a perspective view of one part of a filter unit with several membrane plates.

FIG. 4 schematically illustrates a perspective view of a part of a filter unit with several membrane plates in the zone of the permeate discharge shafts 2. A membrane plate 1 comprises two filter membranes 7, which are arranged on both sides of a supporting plate 8. A permeate discharge shaft 2 of a membrane plate 1 leads from a volume located between the filter membranes 7 to the first longitudinal edge 6a of the membrane plate 1. The shaft preferably is implemented as a rectangular channel essentially vertical to the first longitudinal edge 6a. It is also possible, that the permeate discharge channel is round or oval shaped. A zone around the discharge opening of the permeate discharge shaft 2 preferably is shaped flat. This zone forms welding zones for the sealing 4 at the two longitudinal edges of the permeate discharge shaft 2 and forms welding zones for the permeate collection channel 5 at the short edges of the permeate discharge shaft 2.

During the manufacturing of the filter unit 10, when placing together several membrane plates 1, a welding zone for the sealing 4 of a first membrane plate comes to lie at a welding zone for the sealing 4 of a second membrane plate 1. These welding zones of all membrane plates 1 are melted together respectively in pairs by butt welding in a single work stage. The butt weld utilized for this purpose has a length, which corresponds to a width of the filter unit 10, and a height, which corresponds to a height of the discharge openings. Between the permeate discharge shafts 2, as a result of this, beads of molten material are formed, which in turn form a positive material engagement connection and liquid tight connection against a zone, respectively a volume of unfiltered liquid located between the membrane plates 1.

In a further work stage, the permeate collection channel 11 along the welding edge of the permeate collection channel 12 is welded onto welding zones for the permeate collection channel 5 of the membrane plates 1. For this purpose, the placed together and flat welding zones for the permeate collection channel 5 form an essentially flat surface, so that the welding edge of the permeate collection channel 12 is able to be implemented as straight. The welding zones for the permeate collection channel 5, however, do not imperatively have to be formed as flat. It is also possible, for example, that they are wave-shaped, wherein then also the welding edge of the permeate collection channel 12 has to be correspondingly wave-shaped. For reasons of a simple manufacturing, the flat shape is preferred.

In order to obtain a completely tight connection between the membrane plates 1 in the zone of the welding zone for the permeate collection channel 5, preferably, these zones are welded together in a separate work stage prior to the welding-on of the permeate collection channel 11. In doing so, the welding zones for the permeate collection channel 5 are pressed together flatly with a press stamp in a meltable condition. The press stamp also presses on welding zones of the cover plates 15, which lie adjacent to the welding zones for the sealing 4 of the external membrane plates 1. The shape of the press stamp therefore approximately corresponds to the shape of the welding edge of the permeate collection channel 12.

In FIG. 4, the flat zone 4, 5 around the discharge openings is represented as raised relative to the remaining zone of the first longitudinal edge 6a. The elevation of these welding zones 4, 5 amounts to, for example, 1 to 2 mm. It is also possible, however, that it is not raised, wherein however sufficient material has to be present between the welding points and the groove-spring connection to assure a clean weld. Also illustrated in FIG. 4 are elevations for the formation of a welding bead 14. The welding bead is created by heating the plastic material and pressing on a long stretched-out molding stamp.

FIGS. 5 to 7 schematically illustrate views on to membrane plates placed together in the zone of the permeate discharge shafts 2 in different embodiments of the invention. In contrast to FIG. 4, the welding zones 4, 5 are not depicted as raised or elevated. FIG. 5 corresponds to an arrangement as in FIG. 4. A vertical expanse of the connection zones, in which during butt welding the welding zones for the sealing are welded together, is designated with the reference number 17.

In FIG. 6, a greater distance between the membrane plates 1 is obtained by first distance pieces 9a inserted between the membrane plates 1 in the zone of the first longitudinal edge 6a. In analogy, second distance pieces 9b (not shown) are inserted between the membrane plates 1 in the zone of the second longitudinal edges 6b. In FIG. 7 it is illustrated, how in an alternative embodiment of the invention a greater distance between the membrane plates 1 is achievable by widening the longitudinal edges 6a, 6b.

If one makes do without a cover plate 15, then the welding edge of the permeate collection channel 12 may be provided with a lip protruding in the direction of the membrane plate 1 for the improvement of the mechanical stability and of the quality of the welding joint or welding seam. Said lip surrounds an edge of the first longitudinal edge 6a of the two external membrane plates, when placing on a stack of membrane plates 1.

Exemplary values for the dimensions of a membrane plate 1 and with this also of the filter unit 10 are a length of 30 to 60 cm and a width of 5 to 20 cm. A thickness of the filter unit 10 may amount to 20 to 50 cm or more and may comprise ten, twenty or more membrane plates 1. Correspondingly, filter surfaces of several square meters are realised. In case of a thickness of a membrane plate 1 of 5 mm, a discharge opening is approx. 2 mm wide and 15 to 20 mm high. A thickness of a ridge of a welding zone for sealing 4 then amounts to approx. 1 to 1.5 mm. The welding zone for the permeate channel 5 extends from the discharge opening by a half up to more than one centimeter along the first longitudinal edge 6a. The dimensions indicated are to be understood as being by way of example only. Within physically sensible limits the dimensions can be varied essentially as required, without leaving the scope of the invention.

LIST OF REFERENCE MARKS

1 Membrane plate
2 Permeate flow-off shaft
3 Edge of shaft
4 Welding zone for sealing
5 Welding zone for permeate collection channel
6a First longitudinal edge
6b Second longitudinal edge
7 Filter membrane
8 Supporting plate
9a First distance piece
9b Second distance piece
10 Filter unit
11 Permeate collection channel
12 Welding edge of the permeate collection channel
13 Permeate discharge
14 Bump for the formation of a welding bead
15 Cover plate
16 Groove-spring connection
17 Zone for butt weld for sealing
18 Spacer burls

The invention claimed is:

1. A filter unit (10), in particular for a water filter of a water treatment- or sewage treatment plant, comprising a plurality of permanently connected membrane plates, each of the membrane plates comprising a discharge shaft (2), opening outwardly on a longitudinal edge, for removing permeate collected in the membrane plate (1), in which at least two membrane plates (1) are arranged parallel and adjacent to one another and a liquid-tight connection is formed between the at least two membrane plates at least in first welding zones between the discharge shafts (2) of the at least two membrane plates (1), the first welding zones extending longitudinally to intersect a second welding zone that surrounds the group of discharge shafts, wherein the membrane plates (1) are manufactured out of thermoplastic material and the liquid-tight connection is a weldment of the at least two membrane plates (1), and wherein a permeate collection channel (11) surrounds the discharge shafts of the at least two membrane plates and forms a liquid-tight seal around the peripheral welding edge (12) of the permeate collection channel in combination with the second welding zone surrounding the group of discharge shafts.

2. The filter unit (10) in accordance with claim 1, each member plate comprising a further discharge shaft, which is designed in analogy to the initial discharge shaft (2) and which is constructed for connection by means of welding with a second permeate channel, and further comprising a further permeate collection channel, which surrounds further discharge shafts of the at least two membrane plates (1) in a liquid-tight manner.

3. The filter unit (10) in accordance with claim 2, wherein the permeate collection channel (11) or the further permeate collection channel is a hollow profile closed-off at two ends and comprises a permeate discharge (13) for the removal of permeate.

4. A filter unit (10), in particular for a water filter of a water treatment- or sewage treatment plant, comprising several permanently connected membrane plates, the membrane plates comprising discharge shafts (2) opening outwardly on a longitudinal edge for the removing of permeate collected in the membrane plate (1), in which at least first and second membrane plates (1) are arranged parallel to one another and wherein at least one distance piece (9a) is arranged between a first and a second membrane plate (1) and wherein a first welding zone between the discharge shafts (2) of the at least two membrane plates (1) comprises the first distance piece (9a) and a liquid-tight connection between the first membrane plate (1) and the first distance piece (9a) and a liquid-tight connection between the first distance piece (9a) and the second membrane plate (1), and wherein the first welding zone extends longitudinally to intersect a second welding zone that surrounds the group of discharge shafts, wherein the membrane plates (1) and distance piece (9a) are manufactured out of thermoplastic material and the liquid-tight connections are weldments of the membrane plates (1) and distance piece (9a), and wherein a permeate collection channel (11) surrounds the discharge shafts of the at least two membrane plates and forms a liquid-tight seal around the peripheral welding edge (12) of the permeate collection channel in combination with the second welding zone surrounding the group of discharge shafts.

5. The filter unit (10) in accordance with claim 4, wherein the at least two membrane plates (1) and optional distance pieces (9a, 9b) on an edge (6a,6b) comprise correspondingly arranged bumps (14) for the formation of at least one welding bead for welding together the at least two membrane plates (1).

6. The filter unit in accordance with claim 4, wherein the welding zone formed around the discharge shafts (2) of the at least two membrane plates (1) and optional distance pieces (9a) placed adjacent to one another forms an essentially flat surface.

7. A filter unit (10), in particular for a water filter of a water treatment- or sewage treatment plant, comprising:
   at least first and second permanently connected membrane plates (1) arranged parallel to one another, each of the membrane plates comprising:
      a longitudinal end surface terminating at a first longitudinal border and a second longitudinal border;
      a discharge shaft (2) opening outwardly on the longitudinal end surface for the removal of permeate collected in the membrane plate (1), the discharge shaft being formed within the membrane plate and having one end even with the longitudinal end surface of the membrane plate (1),
   wherein at least in a first welding zone located at least between the first membrane plate discharge shaft (2) and the second membrane plate discharge shaft (2) on the second membrane plate, a liquid-tight connection is formed between the first and second membrane plates,
   wherein a permeate collection channel (11) surrounds the discharge shafts and is attached to the first and second permanently connected membrane plates at a second welding zone for collecting permeate discharged through the discharge shafts, and forms a liquid tight seal around a peripheral welding edge of the permeate collection channel in combination with the second welding zone,
   whereby the first border of the first membrane plate abutting the second border of the second membrane plate is sealingly connected to the second membrane plate in order to prevent water, that is disposed between the first and second membrane plates and has not passed through a membrane, from entering the collection channel.

8. The filter unit of claim 7, wherein the membrane plates (1) are manufactured out of thermoplastic material and the liquid-tight connection is a weldment of the first and second membrane plates (1).

9. The filter unit (10) in accordance with claim 7, wherein the permeate collection channel (11) is a hollow profile closed-off at two ends and comprises a permeate discharge (13) for the removal of permeate.

10. The filter unit (10) in accordance with claim 7, wherein the at least first and second membrane plates (1) longitudinal end surfaces comprise correspondingly arranged bumps (14) for the formation of at least one welding bead for welding together the at least two membrane plates (1).

11. A filter unit (10), in particular for a water filter of a water treatment- or sewage treatment plant, comprising:
   at least first and second membrane plates (1) arranged parallel to one another, each of the membrane plates comprising:
      a longitudinal end surface terminating at a first longitudinal border and a second longitudinal border;
      a discharge shaft (2) for the removal of permeate collected in the membrane plate (1), the discharge shaft being formed within the membrane plate and having one end opening outwardly and even with the longitudinal end surface of the membrane plate (1),
   at least one distance piece (9a) having a longitudinal end surface terminating at first and second longitudinal borders is arranged between the first and the second membrane plate (1) and wherein a first welding zone between the connecting elements (2) of the at least two membrane plates (1) comprises the first distance piece (9a) and a liquid-tight connection between the second border on the first membrane plate (1) and the first border on the first distance piece (9a) and a liquid-tight connection between the second border on the first distance piece (9a) and the first border on the second membrane plate (1),
   a permeate collection channel (11) surrounding the discharge shafts, forming a liquid tight seal around a peripheral edge of the permeate collection channel in combination with a second welding zone on the first and second membrane plates for collecting permeate discharged through the discharge shafts.

* * * * *